March 2, 1965    B. F. CALCIANO, JR    3,171,675
FLOW REGULATOR AND MEANS FOR SECURING AND SEALING
THE SAME TO A STANDPIPE
Filed April 29, 1963

INVENTOR.
BENJAMIN F. CALCIANO JR.
BY
Hansen and Lane
HIS ATTORNEYS

United States Patent Office 3,171,675
Patented Mar. 2, 1965

3,171,675
FLOW REGULATOR AND MEANS FOR SECURING AND SEALING THE SAME TO A STANDPIPE
Benjamin F. Calciano, Jr., 3125 Fillmore St., Bakersfield, Calif.
Filed Apr. 29, 1963, Ser. No. 276,581
4 Claims. (Cl. 285—110)

This invention relates to irrigation flow regulating apparatus and more particularly to a novel arrangement for an irrigation standpipe for controlling the flow of water therefrom.

The present invention is particularly designed for use in connection with round throated irrigation standpipes. These standpipes rise up out of the ground as terminal ends of a source of supply of irrigation water and are normally provided with a valve at their base by which to regulate the flow of water from such source of supply into the standpipe.

Normally, as the water rises up in the standpipe and eventually overflows from the top rim thereof it flows into irrigation ditches or flumes for transmission to row crops and the like. From this it will be appreciated that much of the water is wasted by reason of its loss at and around the standpipe. Moreover, flooding occurs around the standpipe and the earth thereabout becomes muddy and soggy making it difficult for workmen to carry out their tasks particularly in getting to and adjusting the valve by which the flow of water is regulated.

The present invention contemplates the provision of a new means for quickly capping and controlling the flow of water from the standpipe to thereby minimize the loss of water around the standpipe and ultimate flooding of the area surrounding the standpipe. This broad general idea is disclosed in United States Letters Patent No. 3,024,613 which issued on March 13, 1962, to Benjamin Frank Calciano, Sr.

The present invention is directed to a novel arrangement for securing a distribution cap to the standpipe.

It is another object of this invention to provide a simple yet effective structure for quickly securing such a cap to an irrigation standpipe and for sealing the same for regulating the flow of water therefrom. This object contemplates the provision of an inverted cylindrical hood or pot adapted to slip fit into the standpipe and a novel means for wedgingly engaging the inner wall of the standpipe for securing the hood thereto and means for water sealing the hood with respect to the inner wall of the standpipe.

These and other objects and advantages will become apparent from a reading of the following description in the light of the drawing in which.

Figure 1:
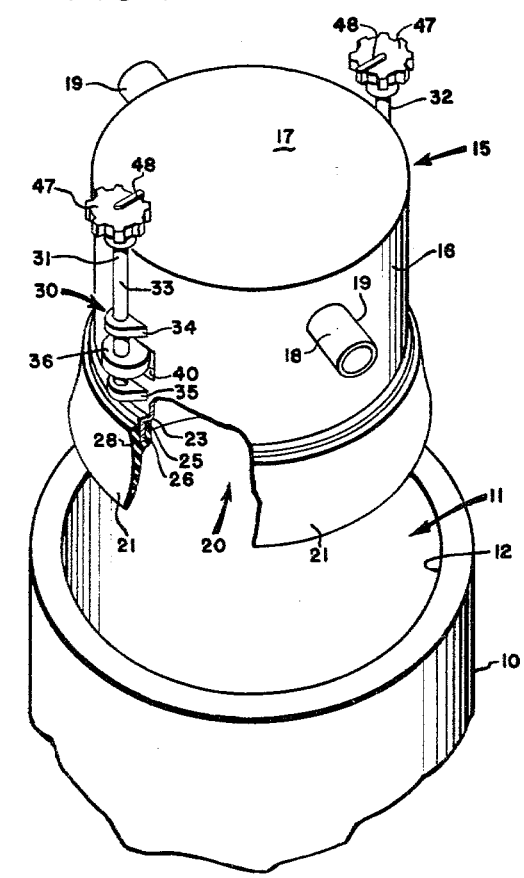
FIG. 1 is an isometric view of a distribution hood having the present invention embodied thereon and about to be placed on a standpipe.

In FIG. 1 there is shown a conventional concrete standpipe 10 consisting of a cylindrical wall 11 formed monolythically with an underground water supply (not shown) which includes a base foundation over the discharge end of an underground pipeline coming from a source of water supply. The conventional standpipe is provided with a valve at the discharge end of a source of water supply so as to control the flow of water up and out of the standpipe. The standpipe 10 stands erect, open end up above the surface of the earth so that water rising out of the standpipe would normally overflow therefrom for direction along irrigation ditches or flumes toward field or row crops and/or trees for irrigating the same.

The distribution hood or flow regulator designated 15 is a cylindrical cap-like body having a cylindrical wall 16 such as to fit down into the open top 11 of the standpipe 10. The hood 15 has a closed top 17 and two or more outlets 18 for directing the flow of water radially outward through the side wall 16 of the hood. These outlets 18 have smaller tubes 19 welded thereto so as to provide a throat upon which irrigation pipes may be secured in a conventional manner.

The open lower end 20 of hood 15 has an annular sealing skirt 21 secured thereto so as to drape freely, downwardly therefrom. This skirting is flexible and preferably made of rubber or the like so as to be forced against the internal wall of a standpipe by water pressure. In the present disclosure I have shown the bottom end of the cylindrical wall 16 as offset outwardly, slightly, to form a base or shoulder 23 for the sealing skirt 21.

The sealing skirt 21 has an enlarged upper end 25 in which is formed an annular groove 26 to receive the annular bottom end 22 of the cylindrical wall 16. Suitable cement or other well known media is used to secure the bottom end 22 in the groove 26.

Figure 3:
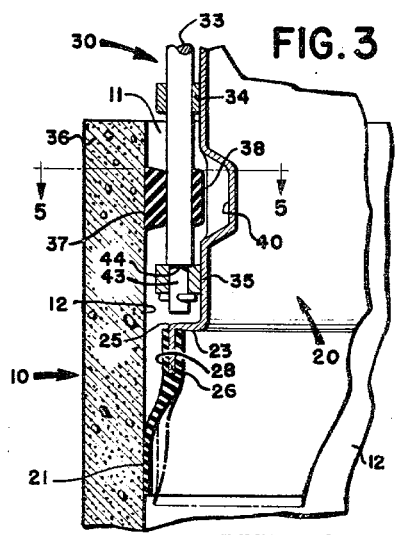
FIG. 3 is a fragmentary detailed section illustrating the securing and sealing means of the present invention.
Figure 4:
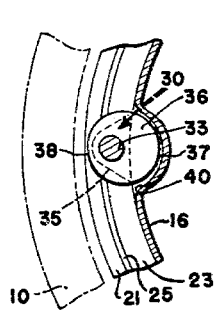
FIG. 4 is a fragmentary horizontal section through FIG. 2 taken along line 4—4 thereof.

The skirt 21 has a natural outward flare so that its terminal end 28 extends to a greater diameter than the hood and cylindrical wall but just within the normal inside diameter of an irrigation standpipe such as the one 10 (see FIG. 3). The arrangement is such that the pressure of the water within the standpipe 10 forces the flared terminal end 28 of the skirting outwardly and against the internal wall 12 of the standpipe to thereby create a water seal.

Means 30 for securing the hood in place within the standpipe 10 comprises a plurality of locking members equally spaced around the perimeter of the hood. Two or more of such locking members may be employed. For purposes of the present disclosure I have shown two locking members 31 and 32 diametrically disposed on the outside surface of the cylindrical wall 16.

Figure 2:
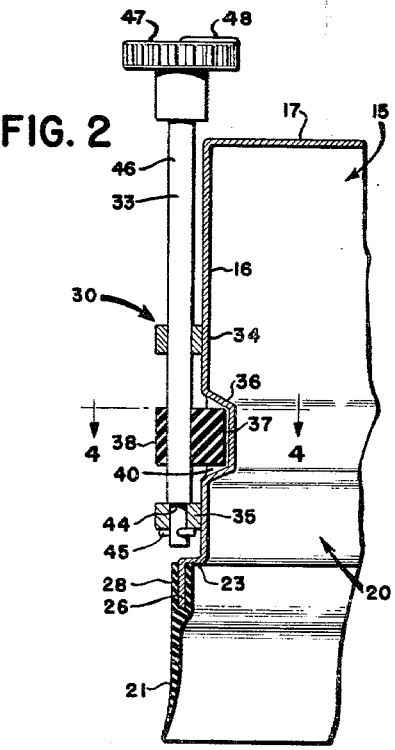
FIG. 2 is a partial vertical section through the distribution hood of FIG. 1 and at larger scale with respect thereto.

Each of the locking members 31 and 32 is identical in structure and therefore like parts of each is designated by a like reference numeral. Referring to FIGS. 1 and 2 each presser member comprises a rod 33 mounted for turning movement upon a pair of spaced ears 34 and 35 extending outwardly from the wall 16 of the hood. The ears 34 and 35 are secured as by welding or the like to the wall 16 and are spaced vertically so as to support the rod 33 vertically and in parallel relation to the cylindrical axis of the hood 15.

Figure 5:
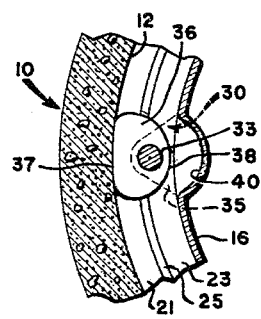
FIG. 5 is a fragmentary section through FIG. 3 taken along line 5—5 thereof.

As best seen in FIGS. 3 and 5 the ears 34 and 35 are well within the orbital diameter of the standpipe 10 so as to clear the inner surface 12 thereof when the hood 10 is to be moved into and/or out of the standpipe. The ears 34 and 35 are disposed in the lower region of the hood and preferably as closely adjacent to the sealing skirt 21 as is permissible.

Each pair of ears 34–35 is spaced sufficiently to provide a trunnion support for the rod 33 and to provide space for a clutch 36 adapted to pressingly engage the inner wall 12 of the standpipe. The clutch 36 is preferably a block of solid rubber or like material mounted on the rod 33 for turning movement therewith. The rubber clutch 36 is mounted eccentrically upon the rod 33 so that one enlarged portion 37 thereof extends radially therefrom a greater distance than the diametrically opposite portion 38 thereof. The enlarged portion 37 is normally disposed to extend inwardly relative toward the hood 15. Since the rods must necessarily be close to the wall 16 of the hood the latter is preferably recessed as at 40 to accommodate the portion 37 of the clutch 36. The recess 40 may be a depression as shown or if desired a complete annular recess band formed in the wall 16.

The lower end 43 of rod 33 is of reduced diameter to provide a shoulder 44 resting on the lowermost ear 35. A cotter pin 45 or any other suitable means is attached to the reduced end 43 of the rod to maintain the latter in place.

The upper end 46 of the rod has a handle 47 thereon whereby to turn the rod 33 and also for gripping the same when the entire unit 15 is to be raised and/or lowered relative to the standpipe 10.

In operation the distribution hood 15 is normally set with all clutch members 36 extending inwardly so as to clear the inner surface 12 of the standpipe 10. Once the hood 15 is properly disposed, as for example with parts as shown in FIG. 3, the several handles 47 are turned to swing the clutches 36 thereon. Suitable indicia 48 on the handle will apprise the operator as to the disposition of the enlarged end 37 of the clutch thereon.

When the enlarged ends 37 of all locking members are disposed radially outward they bear tightly against the wall 12 of the standpipe. Since all clutches engage the standpipe at equally spaced distance around the same the hood 15 will become substantially centered relative to the standpipe 10. In other words the clutches 36 bear with equal pressure against the standpipe wall. The bearing surface of the clutches 36 collectively is calculated to apply sufficient friction to withstand any shifting of the hood axially of the standpipe by reason of the pressure of the water within. If necessary suitable bracing may be provided within the hood 15 to withstand distortion of the cylindrical wall 16 thereof.

While I have illustrated and described a preferred embodiment of the present invention, it will be understood, however, that various changes and modifications may be made in the details thereof without departing from the scope of the invention as set forth in the appended claims.

Having thus described the invention, what I claim as new and desire to protect by Letters Patent is defined in the following claims.

1. The combination with flow regulating hood for capping the open top of an irrigation standpipe in which a self sealing outwardly flared skirting secured to the open bottom of said hood effects a water tight seal between the latter and the inner wall of said standpipe, of means for securing said hood to said standpipe comprising a plurality of locking members arranged in equal spaced relation around said hood, each such locking member comprising a pair of ears secured to said hood in vertical spaced relation, a rod mounted on said ears for turning movement, an eccentric clutch block mounted on said rod between said ears, and a handle on said rod for manually turning the same for moving said eccentric block into bearing engagement with the inner wall of said standpipe.

2. A flow regulator for irrigation standpipes comprising an inverted cap like hood having an open bottomed cylindrical body diametered to have clearance fit within said standpipe, an outwardly flared flexible annular skirting having its upper end secured to the open lower end of said cylindrical body and draped therefrom for outward flexing against the inner wall of said standpipe by the pressure of water therein for creating a water tight seal, and means for locking said hood at a desired elevation relative to said standpipe including at least a pair of presser members mounted on the side of said cylindrical body diametrically opposite each other and each comprising a pair of ears secured to said hood in vertical spaced relation, a rod mounted on said ears for turning movement, an eccentric rubber block mounted on said rod between said ears and normally disposed with its maximum radial portion facing inwardly of said hood, and a handle on each of said rods for manipulating said hood and for turning said rods to press the eccentric blocks in bearing engagement with the inner face of said standpipe.

3. A flow regulator for irrigation standpipes comprising an inverted cap like hood having an open bottomed cylindrical body diametered to have clearance fit within said standpipe, an outwardly flared flexible annular skirting having its upper end secured to the open lower end of said cylindrical body and draped therefrom for outward flexing against the inner wall of said standpipe by the pressure of water therein for creating a water tight seal, said cylindrical body having an outwardly offset terminal portion providing a shoulder bearing against the upper end of said skirting, and means for locking said hood at a desired elevation relative to said standpipe including a pair of diametrically opposed eccentric presser members on the exterior wall of said cylindrical body and each comprising a pair of ears secured to the side wall of said cyindrical body, a rod journaled in each of said pair of ears and having its upper end extending above the closed top of said hood providing hand grips therefor, and an eccentric clutch block secured to each of said rods for turning movement therewith into and out of pressing engagement with the internal wall surface of said standpipe.

4. A flow regulator for irrigation standpipes comprising an inverted cap like hood having an open bottomed cylindrical body diametered to have clearance fit within said standpipe, an outwardly flared flexible annular skirting having its upper end secured to the open lower end of said cylindrical body and draped therefrom for outward flexing against the inner wall of said standpipe by the pressure of water therein for creating a water tight seal, said cylindrical body having an outwardly offset terminal portion providing a shoulder bearing against the upper end of said skirting, and means for locking said hood at a desired elevation relative to said standpipe including a pair of diametrically opposed eccentric presser members on the exterior wall of said cylindrical body and each comprising a pair of ears secured to the side wall of said cylindrical body, a rod journaled in each of said pair of ears and having its upper end extending above the closed top of said hood providing hand grips therefor, an eccentric clutch block secured to each of said rods for turning movement therewith into and out of pressing engagement with the internal wall surface of said standpipe, and recesses formed on the said cylindrical body in the region of said clutch blocks for accommodating the same when out of pressing engagement with said standpipe.

References Cited in the file of this patent

UNITED STATES PATENTS

| 2,334,012 | Koch | Nov. 9, 1943 |
| 2,493,577 | Franklin | Jan. 3, 1950 |
| 3,024,613 | Calciano | Mar. 13, 1962 |
| 3,082,606 | Calciano | Mar. 26, 1963 |

FOREIGN PATENTS

| 634,117 | Canada | Jan. 9, 1962 |